May 6, 1952 A. C. BARNEBL ET AL 2,595,627
ION EXCHANGE REACTOR
Filed Sept. 25, 1948 3 Sheets-Sheet 1
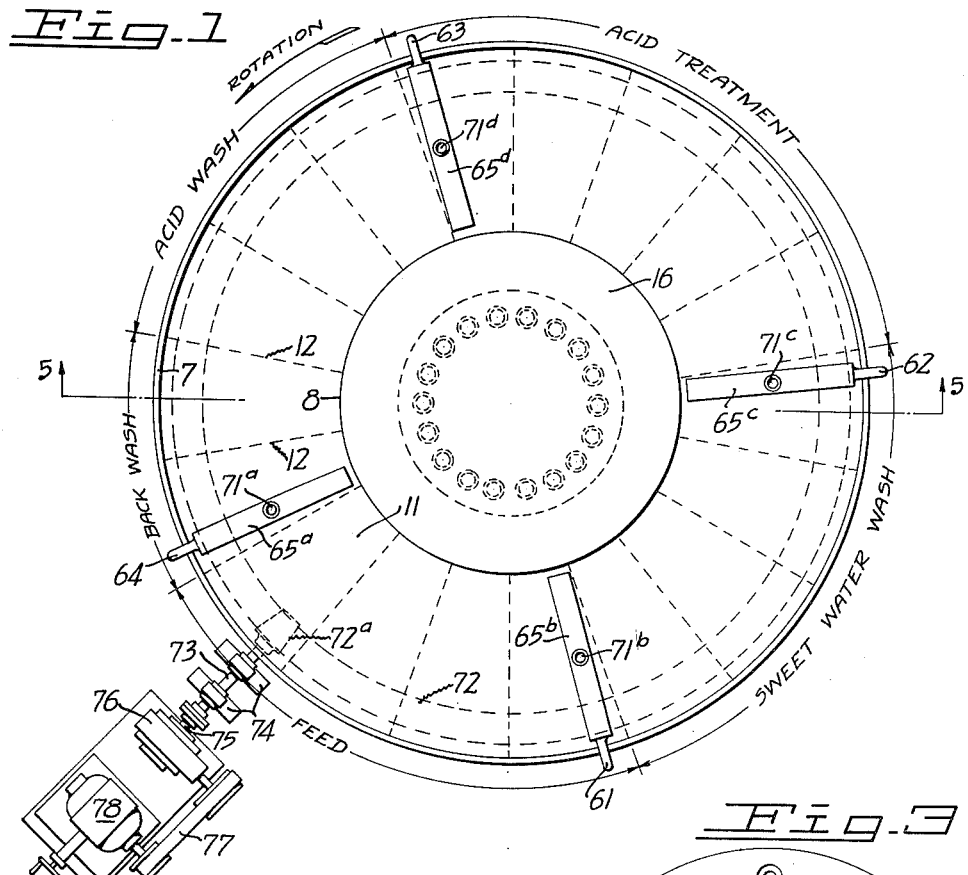
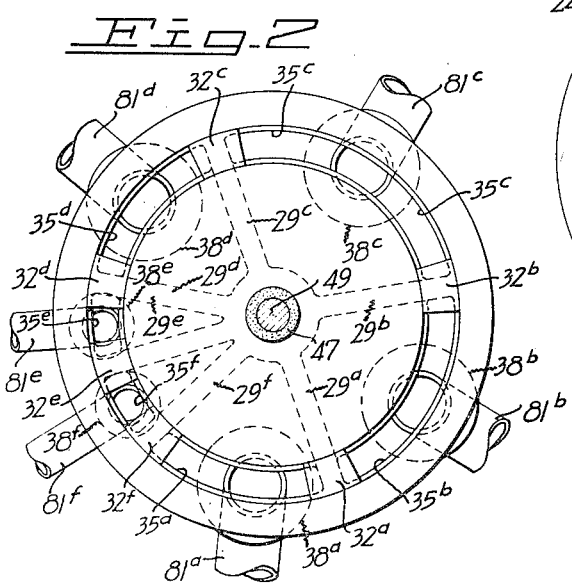
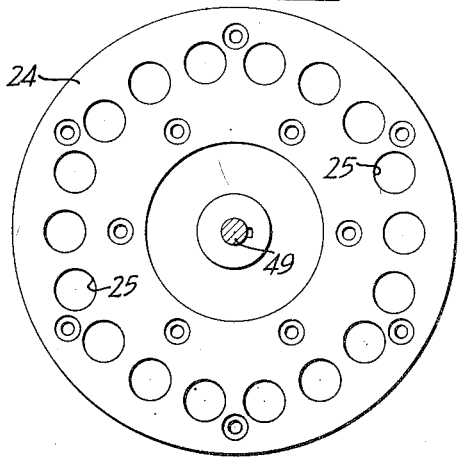
INVENTORS
AUGUST C. BARNEBL
WALTER J. RIKER
BY
Their Attorneys

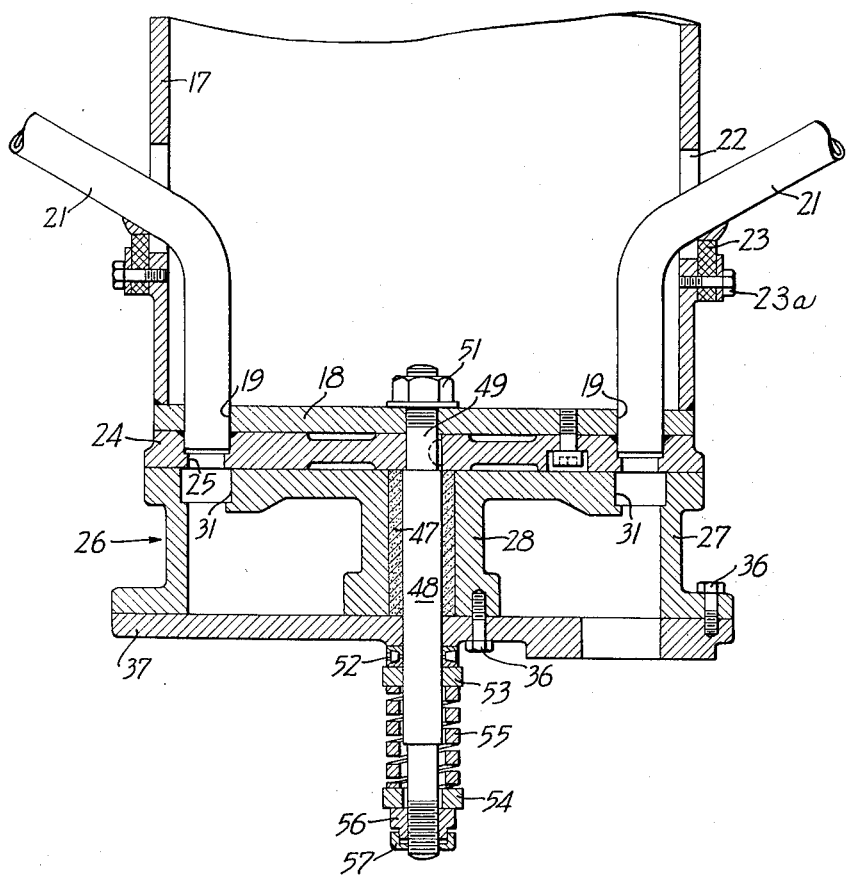

May 6, 1952

A. C. BARNEBL ET AL 2,595,627

ION EXCHANGE REACTOR

Filed Sept. 25, 1948

INVENTORS
AUGUST C. BARNEBL
WALTER J. RIKER

BY
Their Attorneys

Patented May 6, 1952

2,595,627

UNITED STATES PATENT OFFICE 2,595,627

ION EXCHANGE REACTOR

August C. Barnebl, Chicago, Ill., and Walter J. Riker, Englewood, N. J., assignors to Oliver United Filters Incorporated, Oakland, Calif., a corporation of Nevada Application September 25, 1948, Serial No. 51,232

2 Claims. (Cl. 210—24)

1

This invention relates to a process and apparatus for continuously removing ionizable compounds from solutions of ionizable and non-ionizable compounds.

For example, cane and beet juices contain impurities such as mineral salts and organic compounds serving as catalyzers to accelerate the decomposition of the sugar content of the juices when the juices are boiled down for the purpose of crystallizing the sugar. The resulting products of decomposition are not only non-crystallizable, but inhibit the crystallization of the undecomposed sugar, thereby decreasing the recovery of the sugar values. It is, therefore, highly desirable to remove these foreign components from the juice prior to the steps of evaporation and crystallization.

Since it so happens that the objectionable foreign components or impurities are for the most part ionizable, whereas the sugar is non-ionizable, the desired purification can be accomplished by effecting a dual ion exchange between the contaminated juice and two water insoluble ion exchange resins. These two resins may conveniently be designated respectively as cation and anion exchangers. By contacting the juice with a body of cation exchanger, an interchange between the hydrogen ions of the cation exchanger and the cations of the juice is effected, the latter becoming bonded to the exchanger. Similarly, when the cation free juice is contacted with an anion exchanger there is an exchange between the anions of the juice and the hydroxide ions of the anion exchanger, the anions forming a bond with the exchanger, and the hydroxide and hydrogen ions combining to form water.

In time the exchangers become saturated and must be regenerated, this being done by washing the cation exchanger with a mineral acid such as hydrochloric or sulfuric acid, and the anion exchanger with an alkali such as sodium carbonate or sodium hydroxide. Here again, there is an ion exchange; in each instance the hydrogen ions of the acid replacing the cations previously bonded to the cation exchanger and the hydroxide ions of the carbonate or hydroxide ions replacing the anions previously bonded to the cation exchanger.

The process so far described, the nature and function of the ion exchangers used, and the chemical reactions taking place are all well known to the industry. However, the commercial application of this process has been limited to batch operations wherein the sugar juice is delivered

2 to large columns charged with the selected ion exchanger in granular form, and flow is maintained through the column until the ion exchange value of the resin has been exhausted. The column is then removed from service, washed free of sugar juice, the resin is regenerated with the proper regenerants, the regenerants are washed from the column by displacement with water, after which the column is again ready to go back into service. This has proven to be unsatisfactory for the time consumed in the regenerant cycle nearly always is more than the ion exchange cycle.

In general, the object of this invention is the provision of a method and apparatus whereby a continuous series of contiguous but isolated reaction chambers, each containing an ion exchanger, are arranged to travel in a closed path adjacent a number of liquid distributing stations; wherein each of said reaction chambers is charged with a body of an ion exchanger maintained under the influence of a differential pressure during the entire cycle of operation; and wherein a solution to be treated, a solution wash, an exchanger regenerating reagent and a reagent wash is successively delivered to the body of ion exchanger in each of said reaction chambers and drawn therethrough and separately collected.

The invention possesses other advantageous features, some of which with the foregoing, will be set forth at length in the following description where that form of the invention which has been selected for illustration in the drawings accompanying and forming a part of the present specification, are outlined in full. In said drawings, one form of the invention is shown, but it is to be understood that it is not limited to such forms, since the invention as set forth in the claims may be embodied in other forms.

Fig. 1 is a top plan view of a continuous ion exchange reactor embodying the objects of our invention, and in which our continuous ion exchange method can be carried out.

Fig. 2 is a section taken on the line 2—2 of Fig. 5, showing the construction of the automatic valve body forming part of the reactor illustrated in Fig. 1.

Fig. 3 is a section taken on the line 3—3 of Fig. 5 illustrating the wear plate of the automatic valve.

Fig. 4 is a vertical mid-section taken through the automatic valve.

Figure 5:
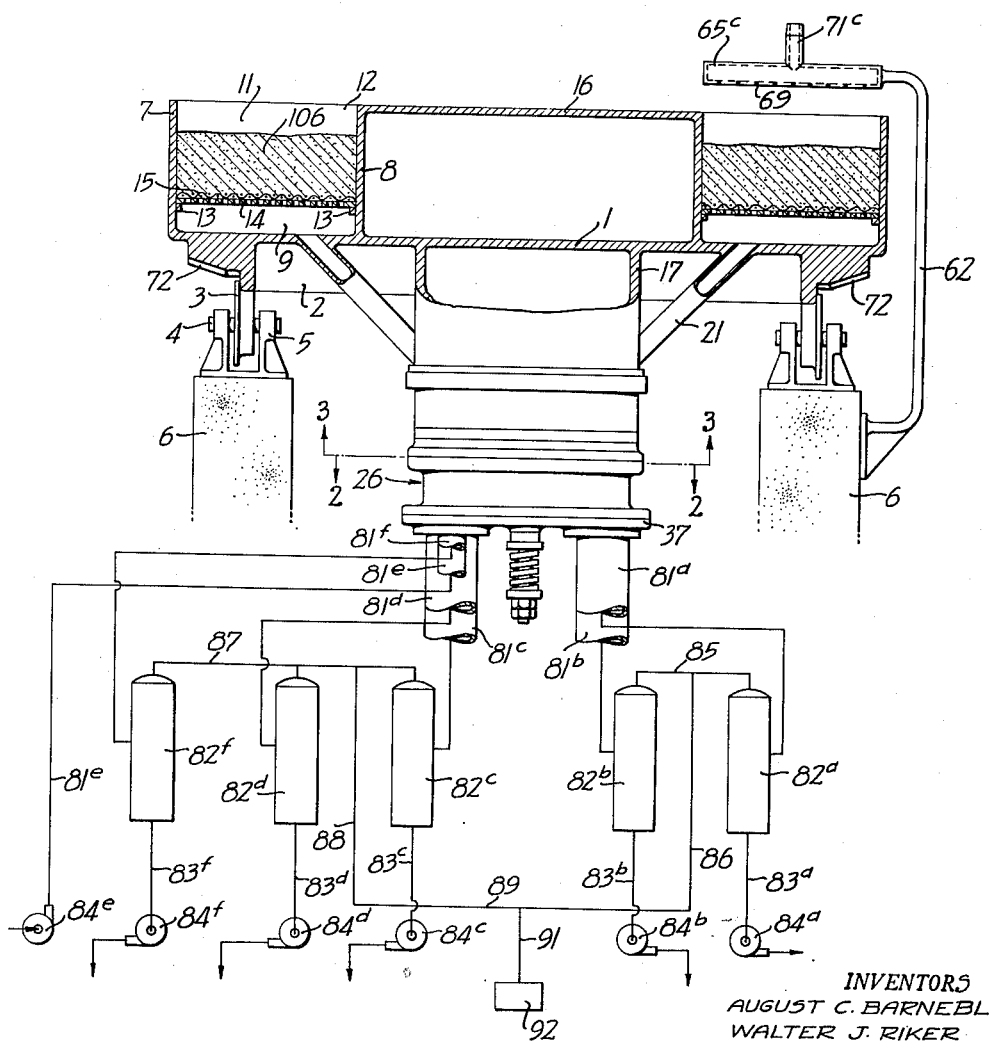
Fig. 5 is a vertical mid-section of the reactor taken on the line 5—5 of Fig. 1, and diagrammatically illustrating the vacuum receivers and other auxiliary equipment associated therewith.

The machine or reactor shown in these drawings (see Fig. 5 in particular) includes a circular plate 1 provided with a downwardly extending annular flange 2 arranged to be supported and rotate on flanged rollers 3. The rollers 3 are carried on shafts 4 journaled in bearings 5, these bearings being mounted on a concrete base 6.

Welded and sealed to the plate 1 are upstanding outer and inner rims 7 and 8 defining an annular channel 9. The channel 9 is divided into a plurality of sector shaped reaction chambers 11 by radially extending walls 12 welded and sealed to the inner faces of the outer and inner rims 8, and to the upper face of the plate 1. Fastened to the rims 7 and 8 a substantial distance above the plate 1, and within each of the reaction chambers 11, are co-planar cleats 13. Supported on each pair of opposed cleats within each of the chambers 11 is a perforate supporting plate 14, and mounted over each of these plates is a wire mesh screen 15. Welded to the inner rim 8 is a circular plate 16 serving to close the cylindrical chamber formed by the inner rim 8 and the plate 1.

Welded to the plate 1 concentrically therewith is a downwardly extending cylinder 17, and welded over the lower end of this cylinder is a pipe plate 18. Formed in the pipe plate 18 are a plurality of concentric radially spaced holes 19, there being one such hole for each of the reaction chambers 11. Welded to the plate 1 beneath each of the chambers 11 and communicating therewith is a pipe 21. Each of these pipes extends through a slot 22 formed in the cylinder 17, and passes through one of the holes 19 in vertical alignment therewith. Each of the pipes 21 is welded intermediate its ends to a ring 23 fastened to the cylinder 17 by bolts 23a. Disposed over the lower face of the pipe ring 18 is a wear plate 24 provided with holes 25 arranged to register with the holes 19 of the pipe plate, each of these holes 25 being formed with a counter-sink for the reception of the lower end of one of the pipes 21.

Seated over the lower face of the wear plate 24 is a stationary valve body generally designated by the reference numeral 26, and including a generally cylindrical casting 27 formed with a hub 28 and with radially extending webs 29a, 29b, 29c, 29d, 29e, and 29f. Formed on the upper face of the valve body 26 is a circular channel 31 and seated within this channel over each of the webs 29a, 29b, 29c, 29d, 29e and 29f are valve bridges 32a, 32b, 32c, 32d, 32e and 32f, the upper face of each of these bridges being flush with the upper face of the valve body. The bridges 32c to 32f inclusive divide the channel 31 into six arcuate valve ports 35a, 35b, 35c, 35d, 35e and 35f of adjustable length, and with which each of the holes 25 successively communicate once during each revolution of the reactor. Fastened and sealed over the lower open end of the casting 27 by bolts 36, is plate 37 provided with six radially spaced outlets 38a, 38b, 38c, 38d, 38e and 38f communicating respectively (see Fig. 2) with the valve ports 35a, 35b, 35c, 35d, 35e and 35f. Mounted within the hub 28 is a bearing 47, and journaled in this bearing is a bolt 48 having a reduced upper end 49 keyed to the wear plate 24 and extending through the pipe plate 18. Threaded over the upper end of the bolt 48 is a nut 51, and mounted over this bolt in engagement with a boss formed on the lower end of the plate 37 is a thrust bearing 52. Seated over this thrust bearing is an upper washer 53, and disposed between this upper washer and a lower washer 54 is a coil spring 55. Threaded over the lower reduced end of the bolt 48 is a nut 56 and a lock nut 57 by which the compression of the spring 55 may be adjusted as desired, so as to maintain the valve body 26 seated against the wear plate 24 under the proper pressure.

Mounted on the concrete base 6 are four upstanding brackets 61, 62, 63 and 64 arranged respectively to support radially disposed distributor pipes 65a, 65b, 65c, and 65d overlying the reaction chambers 11. The pipe 65a is slotted along its lower edge and the pipes 65b, 65c and 65d are provided along their lower edges with perforations 69. Secured respectively to the pipes 65a, 65b, 65c and 65d are nipples 71a, 71b, 71c and 71d. The nipple 71a is arranged to be connected with a source of juice or other solution to be treated; the nipple 71b with a source of water or other solution for effecting a displacement wash of the material passing beneath it; the nipple 71c with a source of an ion exchanger regenerating reagent, (either an acid or alkali solution, depending upon whether the equipment is being used as a cation or an anion exchanger); and the nipple 71d with a source of water or other solution for washing the body of material passing therebeneath, free of the regenerating reagent.

Formed on the periphery of the plate 1 is a bevel gear 72 arranged to mesh with a gear 72a mounted on the end of a drive shaft 73. The drive shaft 73 is mounted on bearings 74 supported on any suitable base, and is coupled to the shaft 75 of a speed reducer 76. The speed reducer is in turn driven through a variable speed drive 77 through an electric motor 78. By means of this assembly it is possible to rotate the plate 1 and its associated mechanism at any desired speed. In a reactor of this character having a diameter in the order of 12 feet, it is feasible to drive the plate 1 at a speed in the order of four minutes per revolution.

The outlets 38a, 38b, 38c, 38d and 38f of the automatic valve above described, communicate respectively through pipes 81a, 81b, 81c, 81d and 81f with the lower ends of vacuum receivers 82a, 82b, 82c, 82d and 82f connected through pipes 83a, 83b, 83c, 83d and 83f with pumps 84a, 84b, 84c, 84d and 84f which respectively discharge treated solution, solution wash, spent reagent and reagent wash.

The upper ends of the receivers 82a, 82b, 82c, 82d and 82f all communicate through lines 85, 86, 87, 88, 89 and 91 with a common vacuum pump 92. The outlet 38e communicates through a pipe 81e with the discharge of a pump 84e, the intake of this pump being connected with a source of water.

To carry out our method of operation on the equipment above described, each of the reaction chambers 11 is charged with a body 106 of a suitable ion exchange synthetic resin to a depth of about eight or ten inches. If the reactor is to be used for effecting a cation exchange with respect to sugar juice, the feed pipe 65a is connected to a source of the juice to be treated; the pipe 65b to a source of water; the pipe 65c to a source of a mineral acid solution; and the pipe 65d to a source of water. This having been done, the reactor and pumps are set into operation, and the valves controlling the flow of liquid to each of the pipes 65a, 65b, 65c and 65d are opened.

During each complete revolution of the reactor there will be a continuous flow of successive streams of juice, wash water, mineral acid solution, wash water, and a back wash through each of the reaction chambers 11 and the body of granular synthetic resin contained therein, this continuous flow being accelerated by the partial vacuum or differential pressure to which each of the reaction chambers is continuously subjected.

The speed of rotation of the reactor; the quantity, depth, grain size and ion exchange characteristics of the synthetic resin; the differential pressure used; the length of the valve port 35a; and the rate of delivery of juice should be so correlated to each other that during the interval that any given reaction chamber is in communication with the valve port 35a, substantially all of the juice delivered thereto will have been drawn through the resin contained therein, substantially free of the contaminating ions for which it is being treated. Furthermore, this correlation of factors should be such that during this interval the rate of ion exchange does not fall below an economical limit. (To determine these factors for any particular solution to be treated, preliminary test runs should, of course, be made.) The treated juice passes through the valve port 35a into its associated vacuum receiver 82a and through its associated vacuum pump 84a to the vacuum pans or other step in the sugar refining process not here involved.

At the completion of this phase of the complete cycle (cation interchange between the juice and the resin) a certain amount of juice is retained within the interstices of the resin, which as above observed, is of granular form. To remove this entrained juice the resin is then subjected to a water wash by means of the distributor pipe 65b. The water thus added should be in an amount not substantially more than that necessary to displace the entrained juice, for the wash water solution passing through the system including the outlet of the pump 84b contains a sufficient quantity of sugar to justify its subsequent recovery, and any excess wash water added therefore represents a power loss.

The washed resin next passes beneath the pipe 65c, and by so doing is regenerated by reacting with the stream of acid solution passing through it, the cations previously bonded to the resin being replaced by the hydrogen ions of the acid. Here again, the acid made to flow through the resin should be not substantially more than required to effect the desired ion exchange. The stream of substantially spent acid flows through the port 35c of the automatic valve under the influence of a partial vacuum into the vacuum receiver 82c, and through this receiver into the discharge of the pump 84c associated therewith.

When the acid regenerated resin passes beneath the pipe 65d the acid entrained therein is displaced by the stream of wash water which is drawn through it and which passes through the receiver 82d and its associated pump 84d.

Immediately after each of the reaction chambers 11 passes through the washing cycle effected by the water or other solution delivered thereto from the pipe 65d, additional wash water is passed upwardly through the body of material being treated, this operation being effected by the pump 84e. The resulting back-wash serves to loosen and tumble the material. Following this the back-washed material is placed under a partial vacuum by the pump 84f so as to drain it of the back-wash water and to complete the entire cycle of operation.

To free the juice of contaminating anions, it is made to pass through a second reactor identical to the one above described with the exception that an anion exchange resin is used instead of a cation exchange resin and that the exchange resin is regenerated with an alkali solution rather than with an acid solution. During the alkali regeneration phase of the cycle hydroxide ions take the place of the anions in the juice and immediately combine with the hydrogen ions previously attached thereto to form water.

In applying our method and reactor to the purification of raw sugar juices it is, of course, preferable first to centrifuge the juice so as to free it of all solid matter.

The depth of the beds of resin contained in the reaction chambers is not critical but depends upon the rate at which the juice, regenerating reagent and washes are pulled through the bed and the percentage of ionizable and foreign substances present in the material under treatment.

Although for purposes of illustration our method has been particularly described with reference to the treatment of sugar juices containing non-ionizable values and ionizable impurities it is of course equally applicable to the treatment of a solution wherein the values are ionizable and the impurities non-ionizable.

We claim:

1. An ion exchange reactor comprising: a plurality of separate, contiguous, concentric reaction chambers mounted for rotation on a vertical axis, each of said reaction chambers being arranged to retain a deep bed of a granular ion exchange resin; a valve member secured to said chambers co-axially therewith and having one face thereof formed with a plurality of concentric holes, there being one such hole for each of said reaction chambers; a pipe connecting each of said chambers with one of said holes; a fixed valve body having a face rotatably engaged by the said face of said valve member, said valve body being provided with a plurality of separate arcuate valve ports arranged to communicate successively with said holes upon the rotation of said valve member; means located above the path of travel of said reaction chambers for delivering to said chambers a stream of solution to be treated, said means lying within the angle subtended by one of the ports of said valve body; means located above the path of travel of said reaction chambers for delivering to said chambers a stream of an ion exchanger regenerating reagent, said last mentioned means lying within the angle subtended by another of the ports of said valve body; and means for rotating said reaction chambers.

2. An ion exchange reactor comprising: a plurality of separate, contiguous, concentric reaction chambers mounted for rotation on a vertical axis, each of said reaction chambers being provided adjacent its bottom with a screen for supporting a bed of a granulated ion exchange resin; a valve member carried by said chambers co-axially therewith and having one face thereof formed with a plurality of concentric holes, there being one such hole for each of said reaction chambers; a pipe connecting the base of each of said chambers with one of said holes; a fixed valve body having a face rotatably engaged by the said face of said valve member, said valve body being provided with a plurality of separate valve ports with which said holes successively communicate upon the rotation of said valve member; a first distributing means located above the path of travel of said reaction chambers for delivering to said chambers a stream of solution to be treated, said first means lying within the angle subtended by one of the ports of said valve body; a second distributing means located above the path of travel of said reaction chambers for delivering to said chambers a stream of an ion exchanger regenerating reagent, said second distributing means lying with the angle subtended by a second port of said valve body; a third distributing means located above the path of travel of said reaction chambers for delivering to said chambers a liquid for washing said ion exchanger free of entrained reagent; and means for rotating said reaction chambers.

AUGUST C. BARNEBL.
WALTER J. RIKER.

REFERENCES CITED

The following references are of record in the file of this patent:

UNITED STATES PATENTS

| Number | Name | Date |
| --- | --- | --- |
| 1,926,505 | Turner | Sept. 12, 1933 |
| 2,413,844 | Rawlings | Jan. 7, 1947 |

FOREIGN PATENTS

| Number | Country | Date |
| --- | --- | --- |
| 506,820 | Great Britain | Aug. 30, 1937 |